United States Patent [19]

Louis

[11] Patent Number: 4,628,779
[45] Date of Patent: Dec. 16, 1986

[54] FEED APPARATUS FOR MACHINE TOOLS

[75] Inventor: Alexandre Ed. Louis, Le Landeron, Switzerland

[73] Assignee: Societe de Vente et de Fabrication pour le Decolletage Lns SA, Orvin, Switzerland

[21] Appl. No.: 712,072

[22] Filed: Mar. 15, 1985

[30] Foreign Application Priority Data

Mar. 27, 1984 [CH] Switzerland ............ 1541/84

[51] Int. Cl.$^4$ ............................................. B23B 13/02
[52] U.S. Cl. ..................................... 82/2.7; 82/38 R; 82/39; 414/14
[58] Field of Search .............. 82/2.5, 2.7, 38 R, 38 A, 82/39, 2 R, 1 C; 414/14, 15, 16, 17, 18

[56] References Cited

U.S. PATENT DOCUMENTS

| 3,145,513 | 8/1964 | Porath . | |
|---|---|---|---|
| 3,147,653 | 9/1964 | Jones | 82/2.7 |
| 3,606,807 | 9/1971 | Rast | 82/38 R |
| 4,037,733 | 7/1977 | Doe et al. | 82/2.5 |
| 4,088,230 | 5/1978 | Doe et al. | 82/2.7 |
| 4,406,190 | 9/1983 | Mason | 82/2.7 |
| 4,417,491 | 11/1983 | Ve Hara et al. | 82/2.7 |
| 4,507,992 | 4/1985 | Vandevoir et al. | 82/2.7 |

FOREIGN PATENT DOCUMENTS

| 103072 | 3/1984 | European Pat. Off. | 82/2.7 |
|---|---|---|---|
| 2930310 | 10/1980 | Fed. Rep. of Germany | 82/2.5 |
| 2080160 | 2/1982 | United Kingdom . | |
| 543493 | 3/1977 | U.S.S.R. | 82/39 |

OTHER PUBLICATIONS

Author, Professor Ichiro Inasaki of Hiyoshi, Japan, which appeared in the journal *Werkstat und Betrieb*, No. 111 (1978), p. 9, entitled "Optimierung Hydrostatischer Axelager bei Werkzeugmaschinen".

*Primary Examiner*—Francis S. Husar
*Assistant Examiner*—Jerry Kearns
*Attorney, Agent, or Firm*—Parkhurst & Oliff

[57] ABSTRACT

In order to increase the product of the speed of rotation times the diameter of the bar stock, the inventive feed apparatus comprises, for guiding the bar stock, a plurality of bearing units constituting the non-rotary part of a hydrostatic bearing receiving oil under pressure. For introducing a fresh piece of bar stock, two rotary components of the bearing unit are capable of opening. A central passage may be either entirely closed and locked, a lever then being completely pushed back, or set ajar, for each bearing unit in sequence, so as to allow the carrier of a pusher to pass, or wide open to allow the fresh bar stock to enter, the mentioned lever then being completely pulled. The feed apparatus is particularly suitable for a computerized numerical control (CNC) automatic lathe.

33 Claims, 14 Drawing Figures

FEED APPARATUS FOR MACHINE TOOLS

BACKGROUND AND SUMMARY OF THE INVENTION

This invention relates to feed apparatus for machine tools, particularly for automatic lathes, of the type having bearing units, each one of which includes a circular passage receiving an injection of oil, intended for a machine working a material supplied to it in the form of a bar capable of being driven rotatingly at high speed by the machine and which is pushed by a pusher having a carrier.

U.K. Published Patent Application No. 2,080,160 proposes feed apparatus of the aforementioned type made by disposing one behind the other bearing plates suitable for guiding a bar of material to be machined. In this apparatus, the bearing plates are axially movable during operation, and the unit which they form contracts in the manner of an accordion as the bar advances. When all the bearing plates are pushed together toward the front, in the direction of the machine tool, it is cumbersome to introduce a fresh piece of bar stock; moreover, the part forming the carrier fixed to the rearward end of the pusher (bearing plate 28d in this U.K. publication) need never pass a bearing plate because these plates recede before the carrier as it advances. It has been noticed, however, that in such a design, the bearing plates cannot be held very firmly on a frame since they must be able to slide axially. Considering the development of machine tools and the performance which this development demands of feed apparatus, as will be explained below, it would be desirable to have feed apparatus of the type initially mentioned in which the bearings are fixed firmly and non-displaceably on the support frame of the feed apparatus during operation. Fixing of the bearing plates would involve numerous problems, however, relating to the introduction of a fresh or subsequent piece of bar stock and to the advance of the carrier. It would, in fact, be necessary to have available at the rear of the feed apparatus a free space as large as the apparatus itself, first for running the bar in, then for providing the space needed for a pusher which ought to be as long as the bar of material.

The prior art also includes hydrostatic bearings, the theory of which has been thoroughly examined, particularly in an article by Professor Ichiro Inasaki of Hiyoshi, Japan, which appeared in the journal *Werkstatt und Betrieb*, No. 111 (1978), page 9, entitled "Optimierung hydrostatischer Axelager bei Werkzeugmaschinen." However, such previous studies and reports hardly considered the very special case of feed apparatus in which a bar of material, continuously replaced during operation, must rotate at high speed at the same time as it must advance through the feed apparatus.

U.S. Pat. No. 3,145,513 relates to a bearing supporting a workpiece rotating at high speed. There, however, it is primarily a question of rotatingly supporting camshafts during grinding or truing, which does not involve any axial displacement of the shaft in the bearing. The bearing disclosed in this U.S. patent is of the hydrostatic type, and the specification shows that it may be opened laterally (by sections 40, 41). However, this disclosure is remote from the problem of feed apparatus; for although lateral opening of the bearing is provided for positioning a camshaft, there is no provision (nor any reason) for satisfying the special requirements of feed apparatus, particularly the requirement for sequential operation of the bearing units, considering that some of them (at the front) must also reliably perform their function of hydrostatic rotary guidance, whereas one or more other bearing units (at the rear) must allow the carrier to pass. Very particular means for controlling the various bearing units must therefore be provided in the case of feed apparatus in order to satisfy conditions not encountered in U.S. Pat. No. 3,145,513.

In this context, it is important to note that in the field of machine tools, and especially that of automatic lathes, the speed of rotation of the bar stock has hitherto been determined by the maximum linear speed permitted by the cutting tools machining the bar, as a result of which large-diameter bars have rotated at a relatively moderate speed, whereas very high speeds of rotations have been applied only to small-diameter bars. The feed apparatus for automatic lathes proposed until now has allowed such speeds of rotation of the bar stock.

Recently, however, the situation has changed because of the advent of numerically controlled (NC) automatic machines, particularly automatic lathes, especially those having "computerized numerical control" (CNC). With such machines, the cutting speed permitted by the commercially available tools (currently some hundreds of meters per minute) tends to be utilized to the maximum in all machining situations, meaning that when machining an end nib 10 mm. in diameter on such an automatic lathe from a piece of bar stock 50 mm. in diameter, for example, the tendency is to rotate the bar so as to maintain the high cutting speed even then, which means that the speed of rotation is no longer limited by the diameter of the bar stock, in conjunction with the maximum linear cutting speed permitted by the machining tools. Briefly stated, the nearer the turning tool comes to the center, the faster the bar should rotate, even if it is of large diameter. In the example above, taking the diameter of the bar into account, this means a speed of rotation five times that ordinarily used in the past.

The development of feed apparatus for machine tools, particularly automatic latches, has difficulty keeping up with this technical evolution. A good solution for doing so is proposed by the present invention, having recourse to hydrostatic bearing technology. With hydrostatic bearings, however, the same difficulties are encountered with respect to space requirements and the passing of the carrier as have been mentioned earlier in connection with U.K. Pat. No. 2,080,160. It should be noted that the problem of space is solved on the feed apparatus known as "Hydrobar" and "Super-Hydrobar" marketed by the present assignee, where lateral displacement makes it possible to insert a fresh piece of bar stock from the space alongside the lathe. As the pusher is pushed in that apparatus by hydraulic pressure rather than by means of a carrier, the passage of a carrier is no problem. The aforementioned U.S. Pat. No. 3,145,513 provides, within the framework of the use of hydrostatic bearings, the beginning of a solution relating to the loading space, i.e., the free space needed for loading a fresh bar. However, this prior disclosure does not provide any solution to the problem posed by the passage of the carrier through some bearing units while other such bearing units must maintain their full hydrostatic bearing effect. Moreover, according to the teachings of this U.S. patent, the clearance between the rotary inner part and the non-rotary outer part of the hydraulic bearing is at most a few hundredths of a millimeter, preferably a few microns. Now, the tolerance in the diameter of bar stock does not allow the provision of so small a clearance in the case of feed apparatus, where each bar slides along its length through the bearing, and where the bars are frequently replaced. Use in feed apparatus requires that a larger hydrostatic interstice be provided, in a manner not obvious from the prior art.

Thus, in endeavoring to produce hydrostatic bearing-unit feed apparatus of this type, numerous problems are encountered which have not been solved by the prior art. The present invention aims in general at providing feed apparatus with a very high speed of rotation of the bar stock, by means of which a solution may be found to the problems discussed above.

A further problem, likewise solved according to a particular aspect of this invention, consists in the use of bar stock having a polygonal, especially hexagonal, cross-section. It is obvious to provide for that purpose a rotary part having a matching polygonal inner shape, but then lateral opening of the bearing unit for insertion of a bar and/or for the passage of a carrier poses a problem which is difficult to solve. As it happens, the prior art, and more specifically U.S. Pat. No. 3,135,533, which is the only one to provide for a hydrostatic bearing opening laterally, does not propose or even suggest any solution. The provision of feed apparatus of the type in question for bar stock of polygonal cross-section is likewise one of the important capabilities of the present invention.

Hence it is an object of this invention to provide improved feed apparatus for a machine tool, particularly for an automatic lathe, by means of which the drawbacks, inadequacies, and limitations known to the prior art are avoided.

A further object of this invention is to provide such feed apparatus capable of working under the particular conditions which tend to be imposed by the current development of machine tools.

Still another object of this invention is to provide feed apparatus capable of guiding a piece of bar stock rotating at very high speed even though it is of a considerable diameter; this is understood to mean a speed of rotation which may reach and even exceed 6,000 rpm or as much as 10,000 rpm with bars at least 60–80 mm. in diameter.

To this end, in the feed apparatus according to the present invention includes a series of spaced, fixed bearing units, the respective circular passages of which are axially aligned for the passage of the bar stock. Each bearing unit receives the injection of oil in order each to constitute the non-rotary part of a hydrostatic bearing, the rotary part of the latter being the bar stock itself or an intermediate rotary member through which the bar passes. The bearing units each comprising several unit portions, in each of which a part of the passage is formed, each unit portion thus including a concave wall forming, along an arc, part of the circumference of the passage. No individual arc exceeds a length on the order of half the circumference. The unit portions are capable of moving away from one another to provide a lateral opening, and control means are provided, in a cooperative relationship with the unit portions of the series of bearing units, to bring about successively for each bearing unit, at the moment when the carrier approaches it, such a lateral opening of a size at least sufficient to allow the carrier to pass. The control means likewise is capable of causing the unit portions in all the bearing units to move away from one another so as to open a large lateral access route by means of which a fresh or subsequent piece of bar stock can be laterally introduced, whereupon the unit portions are put back into end-to-end mutual contact so that their respective concave walls once more form the fixed part of a hydrostatic bearing for the fresh bar.

The advantage of the various preferred embodiments of the invention to be described and claimed hereinafter resides particularly in a design which is at once reliable, simple, and effective, in very efficient use of the particularities—for many still unexplored—of hydrostatic bearings, in the achievement under advantageous conditions of feed apparatus for automatic lathes attaining performances hitherto deemed virtually impossible, etc.

The phrase "arc not exceeding a length on the order of half the circumference" as used hereinafter shall be understood to mean that the arc may be less than 180°, equal to 180°, or even exceed 180°, but only to an extent such that the two C-shaped extremities thus formed allow a space to remain between them which is less than the maximum inside diameter only by a few percent. In other words, it is an arc which still permits the lateral introduction of an inside part, taking into account that this inside part has a diameter slightly less than the inside diameter of the part which includes the arc.

The phrase "on the order of 1 mm." as used hereinafter with reference to a difference in diameter between a non-rotary outside part and an inside rotary bar shall be understood to mean that this difference in diameter may range from a fraction of a millimeter (at least several tenths of a millimeter) to several millimeters (at most half a centimeter). In most cases, this value "on the order of 1 mm." will be between 0.5 and 2 mm.

BRIEF DESCRIPTION OF THE DRAWINGS

Preferred embodiments of the invention will now be described in detail with reference to the accompanying drawings, in which:

FIG. 11 is a perspective view of an arrangement for the angular positioning of the rotary intermediate member, mounted on a pusher similar to that seen in FIG. 1 but bearing a rotary actuating ring for repositioning the rotary intermediate member when stopped, e.g., in the arrangement shown in FIG. 10, and FIGS. 12, 13, and 14 are views similar to FIGS. 8, 9, and 11, respectively, relating to a further embodiment.

DETAILED DESCRIPTION OF THE PREFERRED EMBODIMENTS

Figure 1:
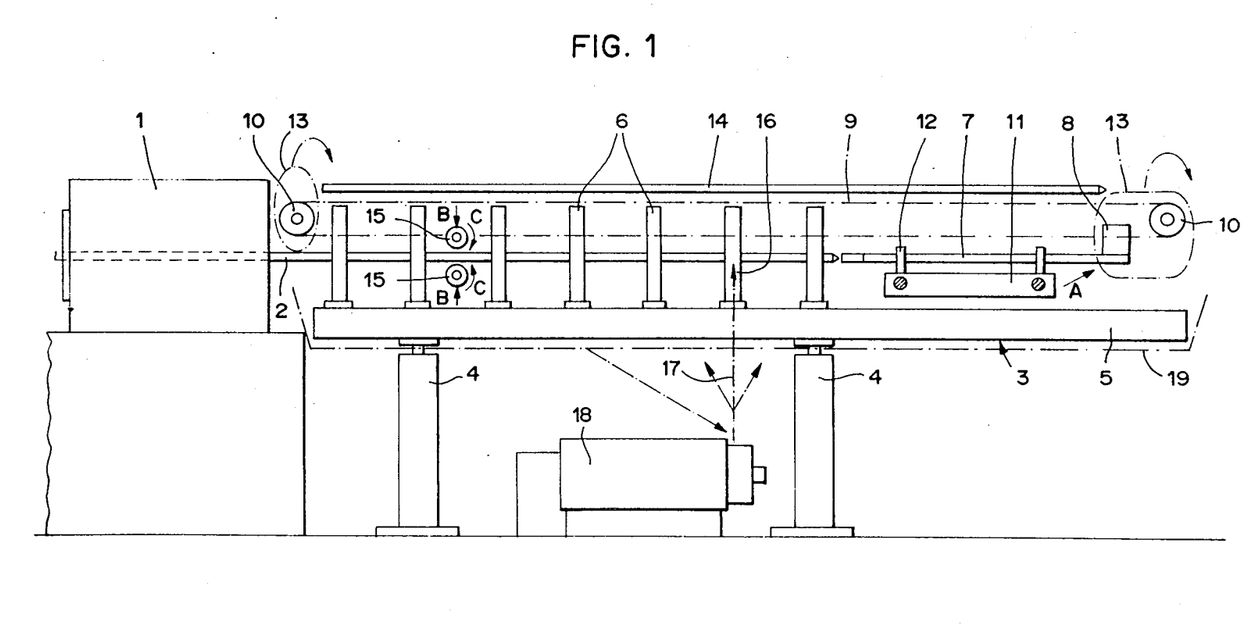
FIG. 1 is a general side elevation of feed apparatus according to the particular concept proposed, comprising seven bearing units of a type peculiar to the proposed concept, equipped with an arrangement of hydrostatic bearings.

FIG. 1 shows an automatic lathe, typically of the CNC type, equipped with a headstock 1, the spindle of which holds a piece of bar stock 2. The bar 2 is machined, at the front of the headstock 1, by machining equipment not shown. Installed at the rear of the headstock 1 is feed apparatus designated as a whole by reference numeral 3. Feed apparatus 3 comprises, mounted on two frame uprights 4, a bed 5 preferably having a hollowed cross-section. Seven bearing units 6 are fixed to the bed 5 at intervals of approximately 25 cm. Each bearing unit 6 includes a circular passage in which a hydrostatic bearing is formed. The seven circular passages are axially aligned, being further aligned with the axis of the spindle of the headstock 1. The bar 2, in the situation shown in FIG. 1, passes successively through each of the seven passages before entering the spindle of the headstock 1. The bearing units 6 are of a type to be explained and described below with reference to FIGS. 2-6. The width of the bearing units 6 as shown in FIG. 1, or actually their thickness, is about 60 mm. Widths appreciably larger or smaller than that may be provided for as necessary. Generally speaking, the axial dimension of this passage of the bearing unit 6 represents from 0.5 to 3 times the diameter of the passage. In operation, the headstock 1 can drive the bar 2 at speed of rotation up to around 10,000 rpm despite the fact that the bar 2 may be up to almost 70 mm. in diameter.

Behind the bar 2 is a pusher 7 comprising a carrier 8 driven conventionally by means of a cable 9 passing over pulleys 10 at the front and rear of the feed apparatus 3. One of the pulleys 10 is controlled to rotate noncompulsorily in a direction such that the pusher 7 is pressed forward, i.e., against the rear of the bar 2, in order to push it toward the headstock 1. The pusher 7 is guided over an intermediate block 11 by guide means 12 (typically V-shaped guides).

It should be noted that the front and rear parts of the feed apparatus 3, each encircled by dot-dash lines 13 in the drawing, are actually rotated back perpendicular to the plane of the drawing (toward the rear thereof) by about 90°, as indicated in FIG. 1, so that the carrier 8 is in reality horizontal or almost horizontal. Furthermore, as indicated in FIG. 1 by an arrow A, the intermediate block 11 equipped with the guide means 12 can be retracted perpendicular to the plane of the drawing so that the pusher 7 is no longer aligned with the bar 2 but laterally retracted relative thereto.

Figure 4:
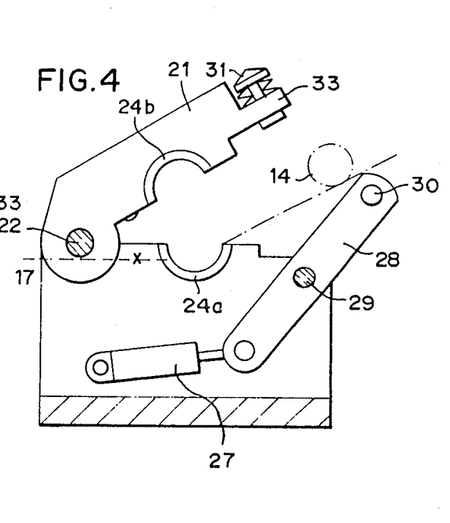
FIG. 4 is a view analogous to FIGS. 2 and 3 but showing the bearing unit open to allow lateral insertion of a fresh piece of bar stock.

As will be seen below, the bearing units 6 can open up to receive a fresh piece of bar stock when the preceding bar is used up. Reference numeral 14 in FIG. 1 designates such a fresh bar ready to take its place in the bearing units 6 when necessary and when the units 6 have opened for that purpose in a manner to be explained below. It is precisely for the insertion of the fresh bar 14 that the pusher 7, with its carrier 8 and its support and guidance arrangement 11, 12, can be laterally retracted, for the bar 14 will be seen to reach axially almost to the rearward end of the pusher 7. It will be understood that when the pusher 7 is retracted and the bearing units 6 are open, the fresh bar 14 can be inserted, then being entirely situated behind the headstock 1. When a fresh bar is thus in place, two driving rollers 15 come to press against either side of this bar, as shown by the arrows B, and start to rotate in the direction indicated by the arrows C. This causes the piece of bar stock to advance and thus to enter the spindle of the headstock 1 until it is in a position, determined at the front of the headstock 1 by means not shown, in which the bar emerges by the desired amount at the front of the headstock spindle. At that moment, the rear of the bar is situated just behind the seventh bearing unit 6, so that the pusher 7 may come back, through appropriate lateral displacement, into axial alignment just behind the bar, as shown for the bar 2 in the drawing. This possibility of lateral retraction of the pusher makes it possible to shorten the feed apparatus as a whole by approximately the length of the headstock 1, which is far from being negligible since in some large automatic lathes, the headstock may be as much as about one meter long.

It has been stated that each of the bearing units 6 provides a hydrostatic-type bearing for the bar 2. Each bearing unit 6 therefore includes a pressurized oil intake 16 at the end of an oil conduit 17 coming from an oil-feed pump 18. The pressurized oil is naturally distributed similarly to each of the seven bearing units 6; in addition, pressurized oil must likewise be supplied to various hydraulically-controlled elements. Either the same pressurized oil as is supplied to the hydrostatic bearings may be used for that purpose, or different oil, as the case may be. It should be noted that the term "oil" as used herein is understood to mean any liquid used for hydraulic purposes which is suitable for a hydrostatic bearing, which liquid may be other than actual oil. As for the means for controlling the various members (particularly the opening of the bearings), although the present embodiment provides for operating them hydraulically, other types of actuation, e.g., pneumatic, electromagnetic, etc., would be equally possible.

As shown schematically by means of a dot-dash line 19 in FIG. 1, a collection vat is provided under and around the bed 5 for recovering the oil which escapes from the hydrostatic bearings. From the collection vat, the oil returns naturally to the pump 18, preferably passing through an intermediate reservoir (not shown). The oil pressure is approximately 3 atm, the oil used having an ISO viscosity of 100. As will be seen, the rate of flow of the oil is about 1 lt./min. per hydrostatic bearing, so that the discharge is hardly significant.

As the bar 2 and the pusher 7 advance, detection means (not shown) detect the moment when the carrier 8 approaches a bearing unit 6. When the rearward end of the bar 2 ceases to pass through the passage of a bearing unit 6, the oil intake at the bearing in question could be cut off successively from the last bearing to the first. However, as will be seen, the oil intake in the bearing units 6 passes through a capillary passage which limits the flow of oil, so that a cut-off of the oil intake may very well be dispensed with, even in the bearing units 6 through which the bar 2 is no longer passing (the pusher 7 has, in principle, a much smaller diameter, and furthermore only its front end rotates, so that there is no hydrostatic bearing effect when it is the pusher 7 which is going through the passage of a bearing unit 6).

The precision of alignment of the passages in the bearing units 6, i.e., the accuracy of their centering, is on the order of ±0.1 mm., this accuracy being sufficient, taking the particularities of the hydrostatic-bearing feed apparatus into account. This does not hinder rotation in these bearings, at speeds of up to about 10,000 rpm, of bars as large as 80 mm. in diameter. The limit of the product of speed of rotation x diameter is now no longer determined by the feed apparatus but rather by the characteristics of the lathe itself (machining aspects, also the driving power aspect).

Figure 2:
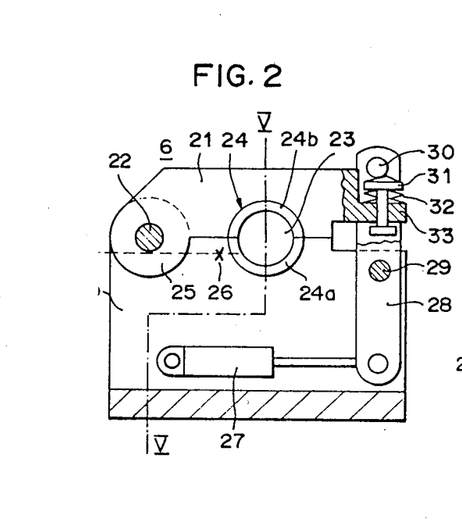
FIG. 2 is a front elevation (i.e., an end view relative to FIG. 1) of one of the bearing units visible in FIG. 1, showing the bearing unit closed and locked.
Figure 3:
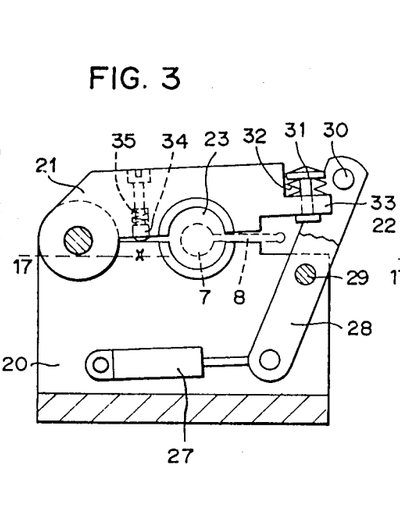
FIG. 3 is a view analogous to FIG. 2 but showing the bearing unit unlocked and ajar in order to allow a carrier to pass.
Figure 5:
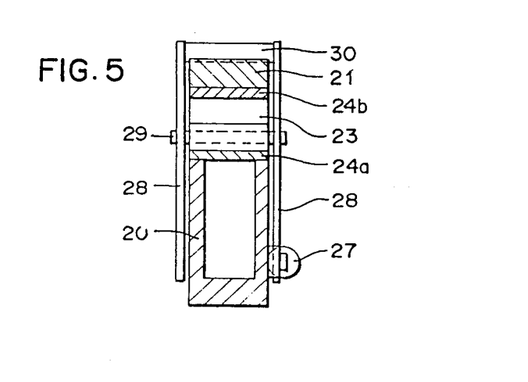
FIG. 5 is a section taken on the line V—V of FIG. 2.

FIGS. 2-6 illustrate the arrangement of a bearing unit 6. Each bearing unit 6 in general comprises two components 20 and 21, the component 20 being fixed to the bed 5, while the component 21 is hinged to the component 20 so that the hydrostatic bearing can be opened. The fixed component 20 is preferably U-shaped, as shown in FIG. 5, although this structure is naturally not compulsory. In FIGS. 2, 3, and 4, it will be seen that the unit component 20 is hinged to the fixed component 20 about an axis 22. In FIG. 2, the bearing unit 6 is shown closed and locked, thus forming a passage 23 as described above for guiding the bar 2. In the embodiment illustrated, half of passage 23 is hollowed out of the component 20 and the other half out of the component 21. These two components are preferably of ferrous metal or of a high-strength light alloy and may form the inside wall of the passage 23 directly. In the present instance, it was found preferable to provide a sleeve 24 of two parts 24a and 24b around the passage 23 in the components 20 and 21, these two sleeve parts each forming a semi-cylinder and being made of a material suitable for a bearing of this type, especially of bronze or of bakelized fabric (canvasite). The parts 24a and 24b may equally well be made of plasticized fabric, plastics, self-lubricating material, etc. They are attached to the unit components 20 and 21, of which they actually form part, by suitable means. If the parts 24a and 24b are non-removably attached, they may be secured by means of an adhesive or bonded, for instance. Shown schematically in the drawing is the inlet of the pressurized oil coming from the conduit 17 (FIG. 1), a pressurized oil inlet duct 25 being made in fixed component 20 and including, as indicated schematically by reference numeral 26, a capillary passage which limits the flow of oil. The oil duct 25 likewise passes through the sleeve part 24a.

There need not necessarily be two unit components; a larger number might do, e.g., three components, the two upper ones of which would open to either side, being hinged to the third, lower, fixed component. Such a design would require that the carrier 8 be positioned, not approximately horizontally, as in the embodiment being described (FIG. 1), but vertically. The number of parts of the sleeve 24 would obviously have to correspond to the number of unit components.

In the embodiment depicted, the condition shown in FIG. 2, i.e., that in which the passage 23 is completely closed, is the locked condition. To achieve this locking, a piston-cylinder arrangement 27 actuates a lever 28, pivoted at 29 and provided with an upper crossbar 30. The lever 28 actually comprises two similar vertical or oblique parts connected by the crossbar 30. FIG. 5 shows how they are disposed. There are two possible arrangements. In the first, the two lever parts 28 are disposed outside the component 21, the piston-cylinder arrangement 27 likewise being disposed outside that component and acting most simply upon just one of the two arms of the lever 28. In the other modification, the two arms of the lever 28 are situated within the U-shaped component 21, and the piston-cylinder arrangement 27 is disposed in the middle, acting upon a crossbar which, similarly to crossbar 30, connects the two lower ends of the two parts of the lever 28. FIGS. 2-5 illustrate the first of these two possibilities.

In the position in which the lever 28 is shown in FIG. 2, the crossbar 30 locks the upper unit component 21 by acting upon a bolting head 31 resiliently supported via springs 32 by a flange 33 at the end of component 21 opposite the hinge point 22, as viewed in FIGS. 2, 3, and 4. The crossbar 30 presses on the convex or conical head 31 with a slight "catch" effect, thus completely clamping the component 21 against the component 20. In reality, although not apparent from the drawing, the locations at which the two components 20 and 21 are pressed against one another include principally the ends of the half-sections 24a and 24b, with a small portion of the material of the main body of the components 20 and 21, as the case may be, so as to ensure that the passage 23 is really completely closed.

FIG. 3 depicts the condition existing when the detection means previously mentioned and not shown have detected that the carrier 8 is approaching the bearing unit 6 in question. At that moment, it is already no longer the bar 2 but the stem of the pusher 7 which is in the passage 23, i.e., the part moving through that passage is no longer rotating. At the approach of the carrier 8, the cylinder 27 actuates its piston in a way that, as shown in FIG. 3, moves the lever 28 into a position in which its crossbar 30 is no longer pressing against the bolting head 31. At that moment, resilient support means 34, 35, shown in broken lines only in FIG. 3, cause the component 21 to rise slightly so that, as shown in FIG. 3, a gap through which the carrier 8 can pass through the bearing unit 6 appears on the side of the passage 23 opposite the hinge point 22.

It will be readily understood how, as the bar 2 ceases to pass through the successive bearing units 6 and, following the pusher 7, the carrier 8 successively approaches each bearing unit 6, the bearing unit 6 in question opens when the piston-cylinder 27 is actuated in order to pass from the condition shown in FIG. 2 to that shown in FIG. 3, in which the bearing unit 6 is ajar so that the carrier 8 can pass through. It will be likewise be understood why the carrier 8 is horizontal in the embodiment illustrated. However, it would easily be possible to provide for a bearing unit 6 having the two components 20 and 21 meeting along an oblique line instead of a horizontal one; in that case, the carrier 8 would have to be positioned obliquely. When all the bearing units 6 have successively been set ajar in order to let the carrier 8 through, and when, the bar 2 being used up, the means acting upon the pulleys 10 (FIG. 1) have caused the return of the pusher 7 with its carrier 8, following which suitable means (not shown) have retracted the pusher 7 laterally on its intermediate base 11, the fresh bar 14 must be placed in the bearing units 6. For the purpose, the "ajar" condition must give way to the open condition shown in FIG. 4. To cause a general opening of all the bearing units 6 as depicted in FIG. 4, a control arrangement as illustrated in FIG. 6 is used.

Figure 6:
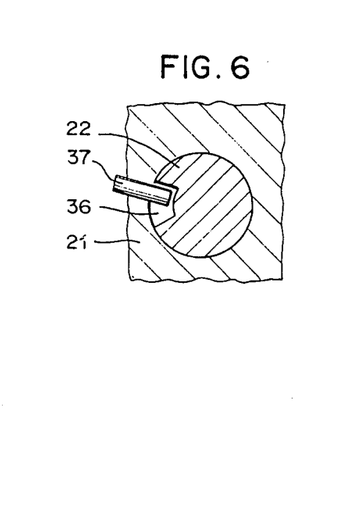
FIG. 6 is a sectional view on a larger scale of the rear part of the bearing unit of FIG. 2, showing the semi-compulsory control of a non-rotary unit component with the aid of a rotary control rod.

FIG. 6 shows the hinge 22 of the unit components 20, 21, consisting of a longitudinal rod common to all the bearing units 6. The rod 22 includes, either all along its length or at least at those locations where it passes through the hinged portion of each component 21, a recess 36 into which there protrudes a pin 37 driven through the rear part of the component 21. From FIG. 6 it will be readily understood that this semi-compulsory control arrangement easily allows the component 21 to rise slightly under the effect of the resilient support arrangement 34, 35 as soon as pressure on the bolting head 31 has ceased, but it also allows the raising of all the components 21 to be completely controlled, i.e., the complete opening of all the passages 23, simply by rotating the rod 22. When the component 21 is to be closed and locked again after the fresh bar 14 has been placed in the half-sleeve 24a, rotation of the rod 22 in the other direction brings all the components 21 back into full contact with the matching components 20, allowing the locking of the crossbar 30 acting upon the bolting head 31. As soon as this locking in closed position of all the bearing units 6 has taken place, the rod 22 once more rotates a few degrees in the other direction to allow the bearing unit 6 to be set ajar when it is again unlocked following detection of the approach of the carrier 8.

Control of the complete opening of all the bearing units 6 might naturally take place in various other ways instead; what is important is that all the units open sufficiently for a fresh bar 14 to be put in place, as shown in FIG. 4. The complete reclosing by means of the control device 36, 37 might be replaced by a partial reclosing, returning the unit components only to the condition shown in FIG. 3, whereupon complete closure would occur owing to the action of the crossbar 30 upon the bolting head 31, in which case, however, the latter would have to have a suitable degree of taper.

In connection with FIGS. 2-5, it must also be pointed out that the sleeves or half-sleeves 24a, 24b are preferably non-permanently attached by suitable means to the unit components 20 and 21, respectively, so that they may be changed in order to modify the inside diameter of the passage 32. With an opening diameter of 100 mm. in the body of the components 20 and 21, passage diameters ranging from 10 to 80 mm. can be obtained by using different sleeves 24 (two half-sleeves in each instance). Two bearing-unit designs might also be provided, one allowing for diameters from 10-40 mm. and the other for diameters from 30-80 mm., by means of interchangeable half-sleeves.

Figure 7:
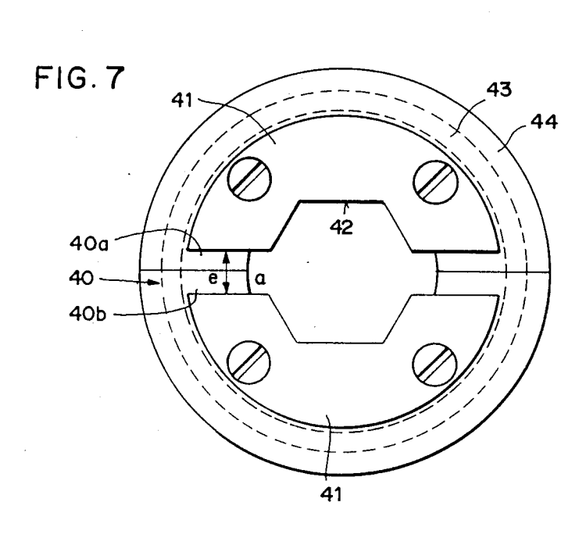
FIG. 7 is an elevation viewed from the same direction as FIGS. 2 and 4 of a rotary intermediate member, insertable into each bearing unit of apparatus designed in general similarly to that shown in FIGS. 1–4, for guiding bar stock of hexagonal cross-section.
Figure 8:
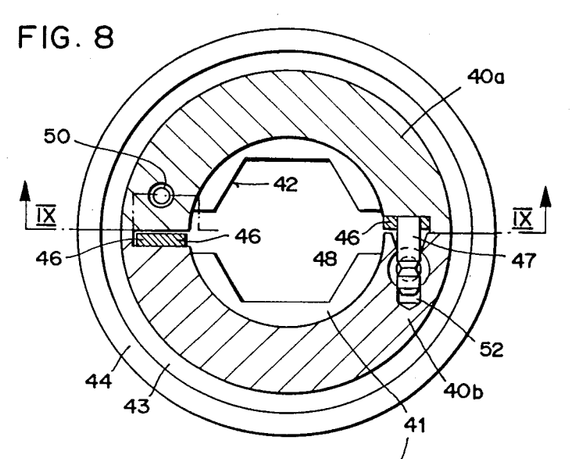
FIG. 8 is a sectional view analogous to FIG. 7, the section plane being parallel to and lower than the drawing plane of FIG. 7.
Figure 9:
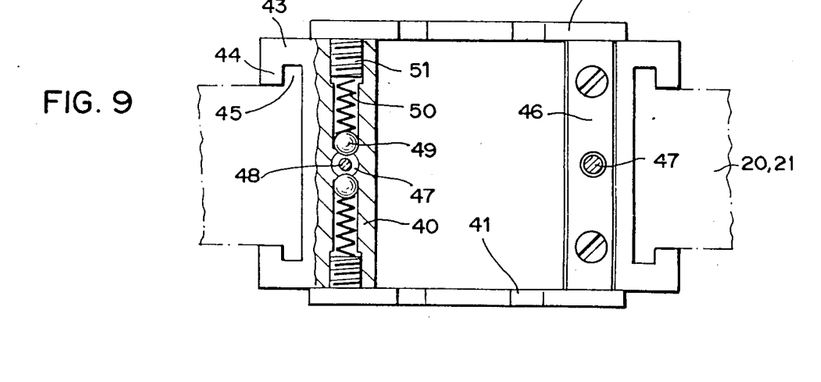
FIG. 9 is a section taken on the (broken) line IX—IX of FIG. 8.

FIGS. 7, 8, and 9 show part of a different embodiment from the one described above. This second embodiment is not very different from FIG. 1 except that the pusher must be of a particular design as shown in FIG. 11. On the other hand, what has been described with reference to FIGS. 2-6 remains applicable, the only difference being that in the second embodiment, it is no longer the piece of bar stock of circular cross-section which constitutes the rotating part of the hydrostatic bearing, the non-rotating part of which is formed by the components 20 and 21. Instead, it is a rotary intermediate member, seen in FIGS. 7-9, which is held in each passage 23 and, rotating itself at high speed in that passage, has a polygonal (in this instance, hexagonal) inside cross-section for feeding a polygonal (hexagonal) piece of bar stock to the headstock 1 of the automatic lathe. This rotary intermediate member therefore takes the place of the bar 2 in the passages 23 of the bearing units 6. FIGS. 7, 8 and 9, as well as FIG. 10 in perspective, show clearly how this intermediate rotary member is constituted. It is formed of a middle sleeve 40 of two parts 40a and 40b flanked on each side of the member by two cheek portions 41 composing a polygonal hole 42. The cylindrical outer part of the sleeve 40 rotates in the bearing-unit components 20, 21 exactly as the bar 2 rotated in this bearing in the embodiment described earlier. The hydrostatic pressure of the oil is such that the two parts 40a, 40b forming the sleeve 40 remain held together, as tests have shown. In the case of the embodiment according to FIGS. 7-10, the sleeve 40 further comprises a radially projecting part 43, then an axial overhang 44, while the components 20 and 21 include around their cylindrical inside surfaces axial rims 45 which fit under the overhanging rims 44 as shown in FIG. 9. With one-piece sleeves, such an assembly would not be possible; as soon as there are non-rotating half-unit components and rotating half-sleeves, on the other hand, the half-sleeves can be placed in the non-rotating components by rotary introduction, despite the very particular sections 43, 44, 45. It should be noted that during rotation the elements 43, 44 play no part; there is no contact between them and the collar 45 or any other non-rotating part, the guidance being achieved entirely in the hydrostatic bearing formed by the sleeve 40 rotating in the non-rotary parts 20, 21.

Figure 10:
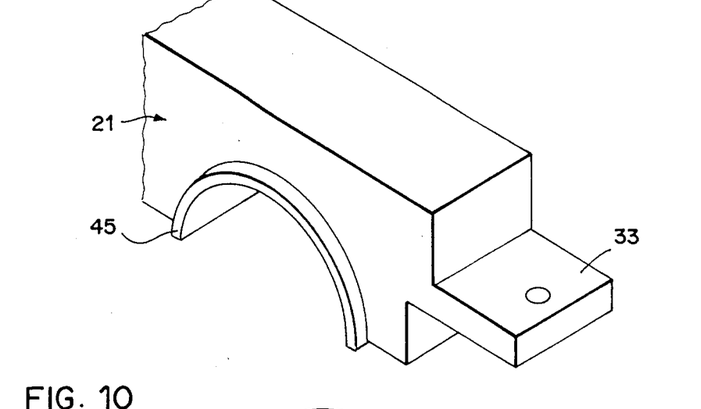
FIG. 10 is an exploded perspective view of part of a bearing unit similar to that shown in FIG. 2, receiving the rotary intermediate member of FIGS. 7-9.
Figures 11, 14:
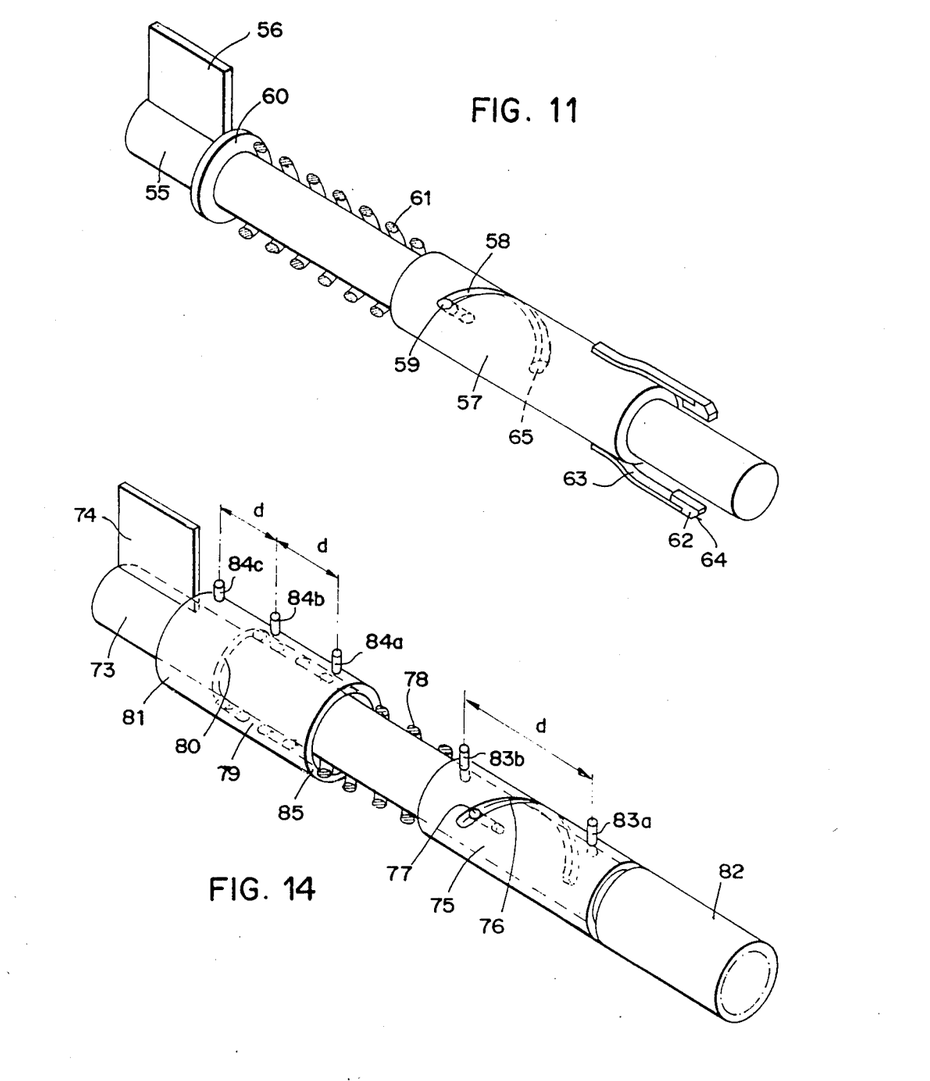

It will be seen in FIGS. 8, 9, and 10 that connection means have nonetheless been provided between the two half-sleeves 40a and 40b in order further to reinforce the effect of holding together due to the hydrostatic pressure. These supplementary connection means consist of small plates 46 fixed to one end of each half-sleeve where there is anchored in each case a stud 47 having a groove 48 and entering a matching opening 52 in the facing end of the half-sleeve. Balls 49, forced toward the middle of the sleeve 40 by springs 50 held by screws 51, then engage the groove 48 of each stud 47 so as to hold the half-sleeves firmly joined to one another.

The design provided for the rotary intermediate member 40, 41 will be readily understood from FIGS. 7-10. It will be noted especially that the inside diameter of the sleeve 40 is larger than the largest dimension of the hexagonal cross-section 42 of the cheek sections 41 having a hexagonal inside outline. This prevents direct contact between the hexagonal bar stock and the sleeve 40. The parts 40a and 40b of the sleeve 40, together with the cheek portions 41 defining the hexagonal inside guiding contour, are preferably made of a material which is both light and robust in view of their high speed of rotation. Although metals may be suitable, lighter materials which are just as strong have proved particularly advantageous, especially bakelized fabric (canvasite), as well as other light materials identical to those recommended for the half-sleeves 24a, 24b.

The plates 46, studs 47, and balls 49, on the other hand, are preferably of metal.

In order to be able to open the bearing unit containing the rotary intermediate member 40, 41 when it has stopped because it is no longer the bar stock which is passing through it, but rather the pusher, this intermediate member must first be repositioned so that one of its halves is situated completely in the unit component 20 while the other is completely in the component 21. Inasmuch as the intermediate member is stopped, it being the rod of the pusher—of circular cross-section and smaller than the bar stock—which is passing through it, this repositioning can be carried out fairly easily, and the particular arrangement of the pusher shown in perspective in FIG. 11 is used for that purpose.

FIG. 11 depicts the rear part of a pusher 55 provided with a carrier 56, basically similar to the pusher 7 of FIG. 1. In this embodiment, however, the pusher 55 is threaded through a bush or sleeve 57 in which there is a spiralling slot or slide extending angularly over slightly more than 180°. Further, a pin 59 is driven into a suitable radial bore in the pusher 55 so as to fit into the slot 58, but without its outer end protruding beyond the outside diameter of the sleeve 57.

Just in front of the carrier 56, the pusher 55 bears a washer 60 against which presses the rearward end of a compression spring 61, the front end of which rests against the sleeve 57. Thus acted upon by the spring 61, the sleeve 57 therefore tends to be carried toward the front of the pusher 55, its angular position then being determined by the position of the rearward end of the spiralling slot 58.

At two diametrically opposed locations, one of which corresponds to the angular position of the carrier 56, the sleeve 57 bears flat springs 63, at the front ends of which there are active lugs 62 having an inclined front flank 64.

In order to understand how the particular pusher arrangement of FIG. 11 acts during operation, it is necessary to consider simultaneously FIG. 1 for the general layout and FIGS. 7 and 11 for the operating details. It will be seen that when advancing, the pusher 55, operating exactly like the pusher 7 of FIG. 1, gradually brings the lugs 62 of its sleeve 57 up against the faces of the last bearing unit 6, or to be exact against the rear face of the rotary intermediate member 40, 41 situated in that bearing unit, in the second embodiment now being described. The lugs 62 therefore strike against the face of the part as shown in FIG. 7; and since the rotary member 40, 41 is not stopped in any particular position, the lugs 62 each butt against an indeterminate location on each of the cheek sections 41 (the inside contour of which forms a hexagonal portion). From then on, the sleeve 57 can no longer advance when the pusher 55 advances, so that relative to the pusher 55, the sleeve 57 retreats (in the sense that the space between the rear of the sleeve 57 and the washer 60 decreases). This relative movement takes place against the bias of the spring 61; moreover, by virtue of the action of the pin 59 in the spiralling slot 58, it brings about a rotation of the sleeve 57 with the lugs 62. This rotation can be 180° at most. However, before these 180° have been travelled, each lug 62 is going to arrive at a space as designated by arrow e in FIG. 7, situated between the two facing edges of the two cheek portions 41. The lugs 62 enter these spaces; and owing to the suitable dimensioning of the assembly, the inclined flanks 64 of the lugs 62 will come to bear just against the edge a of the inside circumference of the sleeve 40. As in this instance, and taking into account the inclination of the flanks 64 of the lugs 62, the resistance of the spring 61 is less than that of the two flat springs 63, the continuing advance of the pusher 55 goes on compressing the spring 61, the lugs 62 remaining in place against the edges a until—the sleeve 57 having rotated almost half a revolution—the pin 59 is situated at the front end 65 of the spiralling slot 58. At that moment, the lugs 62 will have positioned the rotary intermediate member 40, 41 exactly where it is supposed to be for the opening of the bearing unit, taking into account that, as shown in FIG. 11, the lugs 62 in their end positions are angularly shifted by 180°, in alignment with the direction of the carrier 56.

As soon as the sleeve 57 can no longer move any farther toward the carrier 56 along the pusher 55, further advancing of the pusher 55 is necessarily communicated to the sleeve 57 as well. In this case, owing to the inclination of the front flanks 64, the flat springs 63 will flex so that the lugs 62 will give way slightly axially so as to be able to pass through the sleeve 40. While this is happening, the sleeve 57 remains in its rear position as long as the lugs 62 rub against the inside of the sleeve 40. When the lugs have passed all the way through the rotary intermediate member 40, 41, the friction ceases, and the sleeve 57 is pushed forward by the spring 61 into the position shown in FIG. 11.

The same process is repeated when the sleeve 57 and its lugs 62 approach the next bearing unit.

It should be noted that there might equally well be only one lug. The spiralling slot 58 must allow for a total course of approximately 180°. It does no harm if it is slightly more; the total length of the slot must in any case be increased to permit the 180° course, taking the diameter of the pin 59 into account. Since the total angular course is equal to or slightly more than 180°, what is important is the position of the sleeve and the lugs when this sleeve is closest to the carrier, i.e., when the pin 59 is situated at the end 65 of the slot 58. It is therefore mainly the position of this front end 65 of the slot which is of importance.

The repositioning lugs (or possibly a single repositioning lug) might be fixed directly to the sleeve 57 instead, without any provision for resilient radial retraction. In that case, the arrangement would be such that the member which causes the bearing unit to be set ajar goes into action just at the moment when the sleeve 57 is in its position closest to the carrier 56, thus allowing the lugs (or lug) to pass through the rotary member in the same way as the carrier, as shown in FIG. 3.

Other arrangements or contrivances may also be envisaged for the repositioning of the rotary intermediate member 40, 41. In particular, a device may be envisaged in which a sleeve, moving rotatingly in a manner analogous to the sleeve 57, would comprise means other than lugs, e.g., notches for snagging matching projections on the rotary member 40, 41.

The polygonal contour need not necessarily be hexagonal but might, for instance, be octagonal, or possibly square. Furthermore, cooperation of the type between the pin 59 and the spiralling slot 58 might equally well take place the other way around, with the spiralling slot being cut into the cylindrical surface of the pusher, and the pin being integral with the sleeve.

Figure 12:
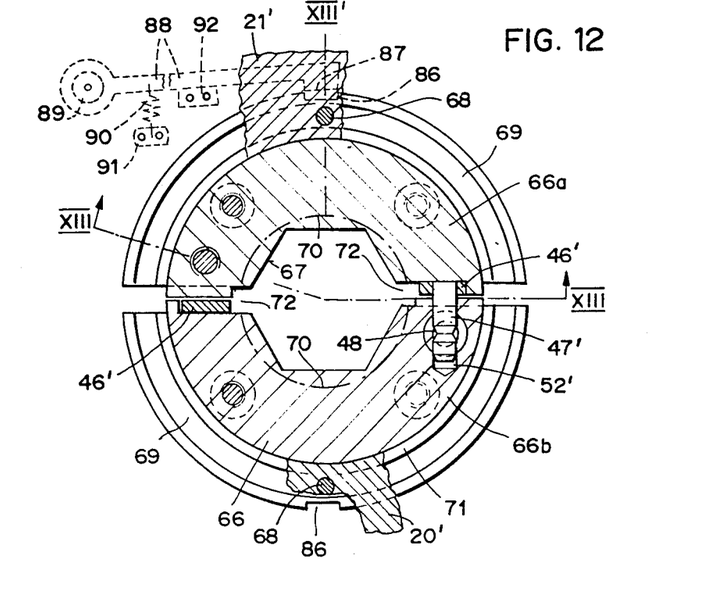
Figure 13:
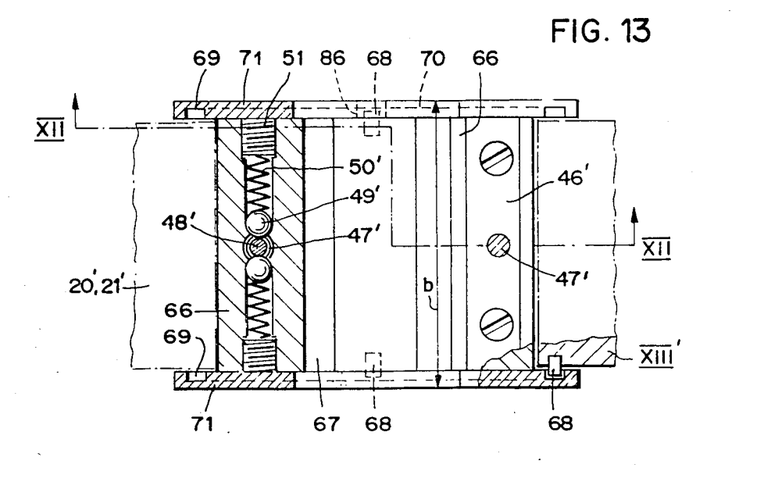

Turning now to the embodiment illustrated in FIGS. 12-14, it will be seen from FIGS. 12 and 13 that in the sector-type portions of the rotary member, the relative positions of the parts having a circular inside contour and those having a hexagonal (or other polygonal) inside contour are reversed. The half-sleeves 66a and 66b (middle parts) form a hexagonal inside contour 67; the cheeks 71, on the other hand, define a circular inside contour 70.

For the mutual engagement of the sector-type portions, this embodiment uses elements 46' to 52', similar to the elements 46-52 of the embodiment depicted in FIGS. 7-9. Moreover, the holding arrangement 43-45 shown diagrammatically in FIG. 10 could have been applied equally well to the design of the intermediate rotary member illustrated in FIGS. 12 and 13; but in this instance, a more easily produced holding arrangement (68, 69, to be described below) has been chosen.

A significant modification relating to the positioning notch is apparent from FIGS. 12 and 13. This notch 72 between the parts forming the sector-type portions of the rotary member takes the form here of a mortise running all the way through the rotary member. Thus, in the closed rotary member, there are two diametrically opposite notches 72 passing completely through the rotary member, i.e., made in the cheek parts 71 and the middle part 66.

With this transverse notch embodiment, the action of the angular positioning means mounted on the pusher is different. This will be explained with reference to FIG. 14.

The pusher assembly of FIG. 14 fundamentally comprises a pusher 73 provided at its rearward end with a carrier 74 and supporting a bush 75 slipped on the pusher 73 and capable of moving angularly and axially relative thereto. In front of the carrier 74, a sleeve 81 is fixed (driven and/or pinned) on the pusher 73. All the way at the front, the pusher 73 has a cylindrical portion portion 82 of much greater diameter; as a modification, the portion 82 might be a sleeve fixed (driven and/or pinned) on the pusher 73 instead. The movable bush 75, the fixed rear sleeve 81, and the front portion 82 (or fixed sleeve) are all of at least approximately the same outside diameter, so that these parts are able to pass through the inside polygonal contour 67 of the intermediate rotary member when it is closed.

In the pusher assembly of the design illustrated in FIG. 14, the bush 75 likewise includes a spiralling notch 76 in which a pin 77 is fitted. A spiral spring 78 pushes the bush 75 toward the front, the rear of this spring entering into an annular space 79 inside the sleeve 81. To create this space 79, the inside diameter of the sleeve 81 at the front is greater than that of the pusher 73. The rear of the spring 78 rests against an inner shoulder 80 of the sleeve 81.

In this embodiment, the axial course of the bush 75 relative to the pusher 73 is preferably limited toward the front by butting against the larger-diameter portion 82 (or fixed sleeve) and toward the rear by butting against the front face 85 of the sleeve 81. Hence the ends of the spiralling notch 76 no longer (necessarily) have the function of limiting the course of the bush 75 on the pusher 73. Advantageously, the spiralling notch 76 will be made a little longer than the spiralling slot 58 of FIG. 11 in order to ensure that it is indeed the sleeve 81 and portion 82 which limit the movement of the bush 75.

In FIG. 14, the bush 75 is shown in the phase where it is slightly retracted from its most advanced position on the pusher 73, i.e., from the position in which it rests against the portion 82.

The bush 85 is seen to be provided, in the vicinity of its front end and in an angular position aligned with the carrier 74 when the bush 75 is in its most advanced axial position, with a lug 83a formed of a pin or similar member driven (or firmly set in some other suitable manner) into the thickness of the bush 75. The lug 83a plays the same part, for the first part of the angular positioning process of the rotary member, as the lug 62 of FIG. 11. In other words, the "search" for the notch takes place in the same way in the sense that the lug 83a butts against the flank of the cheek 71; then, being stopped axially while the carrier continues to advance, this lug rotates, slipping around the cylindrical edge 70 of the cheek 71, until it enters one of the notches 72 (FIG. 12).

Beyond this beginning by entering the notch, the process becomes different from what it was with the pusher of FIG. 11; for inasmuch as the notch 72 goes all the way through the rotary member, as soon as the lug 83a finds the notch 72, it is pushed back toward the front by the force of the spring 78 and, then sliding axially on the pusher, it likewise moves angularly around the pusher owing to the action of the spiralling notch 76 and the pin 77. When the bush 75 thus moves under the influence of the spring 78, the lug 83a slides axially within the notch 72 (FIG. 12) and at the same time drives the intermediate rotary member rotatingly until the bush 75 has returned to it most advanced position resting against the portion 82. The slope of the spiralling notch 76 is such that the maximum angular movement which may be necessary, i.e., a movement of 180°, is travelled by the bush and the lug for an axial movement less than the complete thickness of the bearing unit, i.e., than the length b shown in FIG. 13.

At the moment when the spring 78 has returned the bush 75 to its advanced position on the the pusher 73, the intermediate rotary member has reached the proper angular position, and the lug 83a is still in the notch 72.

The pusher 73 then continues its travel, but it is not certain that the bearing unit and the rotary member are going to open immediately. Provision has therefore been made at the rear of the bush 75 for a second, holding lug 83b aligned with the first, active lug 83a. The distance d between the lug 83a and the lug 83b is less than the thickness (b, FIG. 13) of the rotary member.

Although the second lug 83b is not compulsory, it is advantageous. In addition, the lug 83b makes it possible to alleviate the aforementioned requirement relating to the longitudinal travel of the bush 75 on the pusher 73 (not to exceed b); for when the lug 83a leaves the mortise-shaped notch 72 toward the front, the lug 83b has already entered it at the rear and can, if necessary, terminate its angular positioning action. Three more fixed holding lugs 84a, 84b, and 84c have been provided, which are set similarly to the lug 83a and the lug 83b in the rear sleeve 81 fixed on the pusher 73. The lugs 84a, 84b, and 84c are in angular alignment with the carrier 74, and they likewise have between them a spacing d (FIG. 14) which must not exceed the total thickness b (FIG. 13) of the bearing unit. Furthermore—and this is not shown exactly by the drawing, which is not quite to scale—the distance between the lug 84a, the one farthest forward on the sleeve 81, and the lug 83b, the one farthest to the rear on the bush 75, must not exceed the distance b, either, even in the most advanced position of the bush 75.

It is naturally possible to provide a greater or lesser number of lugs, both movable and fixed ones, the function of the lugs being to ensure in all cases the maintenance of the angular positioning of the rotary member until it opens. Only the presence of at least one of the two movable lugs on the bush 75 is indispensable for the type of operation proposed in connection with FIG. 14.

The use of a pusher of the type shown in FIG. 14 would likewise be possible when, as shown in FIGS. 7–9, the middle part of the sector-type portions of the rotary member has a circular inside contour while the cheeks (or at least one cheek) fixed to these middle parts have the desired polygonal inside contour. In the present instance, with the embodiment according to FIGS. 12 and 13, it has been assumed that for seeking out the notch, the lug 83a would slide around a circular inside contour better than around a polygonal one.

It is indeed important that when the lug 83a rotates, the rotary member does not turn along with it. This depends upon the relation of the torques due to friction. The friction in the hydrostatic bearing itself is not great but is exerted on a large diameter. The friction between the stud or lug 83a and the cheek 71 is likewise relatively slight since, due to the very fact that there is a hydrostatic bearing, the oil of the latter is also spread against the cheeks 71. Moreover, this friction affects a smaller diameter. Finally, there is the friction between the advanced portion 82 of the pusher 73 and the faces of the polygonal inside contour. Tests have shown that if the above conditions are observed, the intermediate rotary member does not rotate along with the lug 83a. However, it would be quite conceivable to provide the front portion 82 (or front fixed sleeve) with surface means for increasing the friction between this portion 82 and the flanks of the polygonal inside contour. Such means might, for example, consist of a resilient or semi-resilient coating of the portion 82 or of some other arrangement capable of providing the friction necessary for restraining the rotary member from the inside.

It should be noted that in the embodiment of FIGS. 7-9 as well as in that of FIGS. 12 and 13, the middle parts and the cheek parts of the sector-type portions of the rotary member might be made in one piece by casting, molding, or thermoforming. Especially certain high-strength plastic materials might be used, as well as metal alloys lending themselves well to casting.

In the embodiment according to FIGS. 12 and 13, the means for holding the rotary sector-type portion in the unit component when the bearing unit opens consist of two studs 68 fitting respectively in a semicircular recess 69 of the semicircular cheek portion 71. As may be seen in the drawing, the sector-type cheek portions extend radially beyond the cylindrical bearing surface of the middle part 66 to border, on each side, the unit components 20', 21' (similar as to their shape and general functions to the parts of the same name in FIGS. 2-4). The peripheral rims formed by the cheek portions 71 therefore ensure that the rotary member (66, 71) is held axially in the bearing unit components 20', 21'. These components are therefore of simple configuration; a slight axial clearance exists between them and the peripheral rims of the cheek portions 71 since the oil coming from the hydrostatic bearing will lubricate these axial holding locations adequately. Approximately in the middle of their semicircular arc, the components 20' and 21' are provided with lateral retaining studs 68; and on the same radius, the cheek portions 71 have semicircular recesses 69 which the studs 68 enter. During operation, i.e., when the bearing unit is closed, the studs 68 are not in contact with the walls of the circular recesses 69. When the bearing unit opens, on the other hand, the studs 68 coöperate with the recesses 69 in such a way that the rotary-member component is held in the non-rotary bearing-unit component. The opening of the bearing unit and of the rotary components, first for the passage of the carrier and then for inserting a fresh piece of bar stock, is therefore certain to take place in a suitable manner.

Looking at FIGS. 12 and 2-4 together, it is seen that for this design of the holding means, the studs 68 are necessary in the upper bearing-unit component 21, which is raised, whereas they would not be indispensable in the bearing-unit component 20, which remains stationary, and in which the rotary member would be held just by its own weight. The stud 68 in the lower bearing-unit component 20 may prove useful, however, for avoiding any risk that through the action of the engagement means 46' to 52', the lower rotary portion may tend to lift together with the upper component.

This design of the holding means, with the studs 68 and the semicircular recesses 69 illustrated in the FIGS. 11 and 12, is simple to manufacture and makes it easy to put the parts together. Assembly is just as easy when the rotary members are in several separate parts (a middle part, two cheek parts), as shown in FIGS. 12 and 13, as when they are made in one piece of molded or thermoformed material (e.g., a synthetic material containing a metallic or ceramic additive increasing its mechanical strength and resistance to wear).

In the upper bearing-unit component 21, when the unit is open (see FIG. 4), the center of gravity of the sector-type rotary component is not directly above the center of rotation; and particularly when subjected to vibration, the rotary component might have a tendancy to disengage itself from the non-rotary component by rotating therein. In order to eliminate this risk, provision has been made, as shown in FIG. 12, to provide the peripheral rims of the cheek parts of the rotary components on at least one side of the bearing unit with stop notches 86, a stop buffer 87 engaging the notch 86 of the upper rotary component upon opening of the bearing unit. The drawing shows the buffer 87 situated at the end of a stop lever 88 pivoted at a point 89 situated at or near the hinge axis 22 of the bearing-unit components (see FIGS. 2-4). The buffer 87 and the lever 88 are drawn downward by their own weight. As an added precaution, a spring 90 hooked to the lever 88 at one end and to a fixed part 91 at the other may ensure that the buffer 87 duly acts. Furthermore, there is a support between the lever 88 and a fixed part, adjoining the component 20 of the bearing unit, for instance, represented by a symbol 92 in FIG. 12. The conditions of this support are such that when the bearing unit is closed, the stop buffer 87 is prevented from dropping into the stop notch 86, so that rotation of the rotary member is not hindered in any way. On the other hand, as soon as the bearing unit is set ajar, and the upper rotary component lifts slightly, the buffer 87 engages the notch 86, and this engagement prevents any subsequent rotation of the rotary component in the non-rotary component. When the upper part is raised into the fully open position (FIG. 4), the engagement continues owing to the weight of the buffer 87 and, as the case may be, to the bias of the return spring 90.

Although the stop (or retaining) means 86, 87 are situated in a middle position in FIG. 12, they might obviously occupy some other position along the periphery of the upper rotary component. Other stop means may also prove suitable. Recourse might be had, for example, to engagement, of the friction or catch type, between the studs 68 and the outer sidewall of the recess 69 when the rotary unit component is "suspended" from the studs 68 in the open state of the bearing. Tests have shown that the design of the rotary member shown in FIGS. 12 and 13 is very advantageous for producing feed apparatus such as that depicted in FIG. 1 with gradual opening of the bearings in sequence according to FIGS. 2-4 for non-round bar stock.

The embodiments of the invention described above naturally do not by any means exhaust all the possibilities of application of the concept proposed. One of the original aspects of this concept is the production of a hydrostatic bearing when having, to begin with, only the non-rotary part of such a bearing, and taking as the rotary part of it a bar of indeterminate origin which need only have a relatively precise diameter (tolerance of a few tenths of a millimeter) and a relatively clean cylindrical surface (a drawn bar in preference to a rolled one). Moreover, what is equally remarkable is that the rotary part of the hydrostatic bearing not only rotates but effects a movement of axial translation. Thus, it may happen that the clearance of the hydrostatic bearing varies during operation, but without this being troublesome.

One interesting particularity of the proposed concept is naturally to have a rotary bearing which opens, both in the case where only the non-rotary part must open (first embodiment described)—the rotary part consisting of the piece of bar stock itself—and in the case where the bar rotates together with a rotary intermediate part (see the examples of FIGS. 7-9 or 12, 13) which preferably comprises a central opening of a particular shape for feeding an automatic lathe with polygonal, typically hexagonal, bar stock.

It will be obvious that there might be more or fewer bearing units than provided for in FIG. 1. In that embodiment, the bearing units are disposed over a length of approximately 2 m. Added thereto is about 1 m. corresponding to the length of the retractable pusher, which is approximately as long as the lathe headstock into which the bar is subsequently inserted. Thus, the total length of the feed apparatus is about 3 m.

Another particularity of the proposed concept is the use of material which is both strong and light, such as bakelized or plasticized fabric, a self-lubricating plastic, etc. These materials have proved advantageous for constituting the parts of a hydrostatic bearing. In the case of the embodiments according to FIGS. 7-9 or FIGS. 12, 13, or in the case of some other similar embodiment comprising a rotary intermediate member, the use of such materials allows a gain in mass, i.e., provides the advantage of less centrifugal force.

What is claimed is:

1. A feed apparatus for machine tools that work on successively supplied pieces of bar stock, each piece being rotatably driven at high speed by said machine tool and axially advanced in a forward direction toward said tool by a pusher having a rod with a front rotating head and a rear carrier, said feed apparatus comprising:

guide means for guiding said bar stock followed by said rod of said pusher, said guide means including a series of spaced, fixed bearing units each having a generally circular passage receiving an injection of oil from an oil inlet, the respective circular passages of the bearing units being axially aligned for the passage of said bar stock and said rod of said pusher therethrough and each receiving said injection of oil to constitute a non-rotary part of a hydrostatic bearing, a rotary part of the bearing unit being said bar stock itself;

said bearing units each comprising at least two components, at least one of which is a movable component and at least one of which is a relatively fixed component, each component including a concave wall forming a part of the circumference of said passage, each part forming an arc having a length not greater than a length on the order of half said circumference of said passage, said components having means for selectively moving said components away from one another to provide a lateral opening in said passage; and control means cooperating with said components of said series of bearing units for successively, partially opening each bearing unit, at the moment when said carrier approaches said bearing unit but after said stock bar and a major portion of said rod have passed through said bearing unit, to form a lateral opening of a size just sufficient to allow said carrier to pass successively through each bearing unit, said control means further controlling said components in all said bearing units to move away from one another by a further amount sufficient to open a lateral access route for lateral introduction of a subsequent piece of said bar stock into said bearing units after advancement of said carrier through all said bearing units, said control means further controlling said components in all bearing units to close said components into end-to-end mutual contact so that their respective concave walls form said fixed part of a hydrostatic bearing for said subsequent bar stock.

2. The feed apparatus of claim 1, wherein each bearing unit includes two components, one component being movable and the other component being fixed.

3. The feed apparatus of claim 1, wherein said components of each bearing unit include locking and unlocking means for selectively locking said components in a closed position when said machine tool is in an operating state and successively unlocking said components at the moment when said carrier approaches each respective bearing unit, said unlocking of each component opening said components to an extent sufficient to allow said carrier to pass in a gap thus opened between said components in each said bearing unit.

4. The feed apparatus of claim 3 wherein said feed apparatus feeds an automatic lathe, the headstock of which is a certain length, said feed apparatus further including means for selectively laterally moving said pusher to allow the retraction of said pusher and lateral introduction of said subsequent bar stock, and means for advancing said bar stock independently of said pusher when said pusher is retracted so that the front end of said bar stock enters inside said headstock of said automatic lathe, said laterally moving means returning said pusher behind a rearward end of said bar stock to act thereupon, lateral retraction of said pusher permitting the total length of said feed apparatus to be shortened by the length of said headstock.

5. The feed apparatus of claim 3, wherein said locking and unlocking means is controlled in response to the advancement of said pusher to progressively unlock said components of each of the successive bearing units approached by said carrier, the complete opening of all bearing units for the introduction of said subsequent bar stock being simultaneously controlled for all said bearing units by a longitudinal shaft on which at least one movable component of each said bearing unit is mounted and partially connected for rotation by a driving pin extending through one of the components and entering a notch in the shaft.

6. The feed apparatus of claim 1, wherein said oil is injected into a fixed component.

7. The feed apparatus of claim 1, wherein the oil inlet for said injection of oil comprises a capillary conduit which limits the flow of said oil, thereby eliminating the necessity of interrupting the supply of said oil in each said hydrostatic bearing at the moment when said bar stock is no longer situated therein.

8. The feed apparatus of claim 1 wherein said passage is intended for round bar stock having a tolerance of diameter of a few tenths of a millimeter, and wherein the difference between the inside diameter of said passage of each said bearing unit and the nominal diameter of said bar stock is on the order of 1 mm.

9. The feed apparatus of claim 1, wherein said bearing units are longitudinally spaced at intervals of between 20 and 35 cm., each said bearing unit comprising, in portions forming the body of said components, an opening of a diameter on the order of 10 cm. in which are situated matching sector-type portions of a sleeve which reduce the diameter of said passage for said bar stock in order to adapt it to the diameter of said bar stock, said sleeve portions being interchangeable for adapting the diameter of said passage to various values situated in the range of from 10 to 70 mm.

10. The feed apparatus of claim 9, wherein said sleeve portions are made of a material selected from the group consisting of bakelized fabric, plasticized fabric, plastic material, and self-lubricating material.

11. The feed apparatus of claim 1, wherein said rotary part of each said hydrostatic bearing in each said bearing unit is said bar stock.

12. A feed apparatus for machine tools that work on successively supplied pieces of bar stock, each piece being rotatably driven at high speed by said machine tool and axially advanced in a forward direction toward said tool by a pusher having a rod with a front rotating head and a rear carrier, said feed apparatus comprising:
   guide means for guiding said bar stock followed by said rod of said pusher, said guide means including a series of spaced, fixed bearing units each having a generally circular passage receiving an injection of oil from an oil inlet, the respective circular passages of the bearing units being axially aligned for the passage of said bar stock and said rod of said pusher therethrough and each receiving said injection of oil to constitute a non-rotary part of a hydrostatic bearing, a rotary part of said hydrostatic bearing formed in each bearing unit by a rotary intermediate member held axially in said non-rotary part by axial holding means, said bar stock passing through said intermediate rotary member;
   said bearing units each comprising at least two components, at least one of which is a movable component and at least one of which is a relatively fixed component, each component including a concave wall forming a part of the circumference of said passage, each part forming an arc having a length not greater than a length on the order of half said circumference of said passage, said components having means for selectively moving said components away from one another to provide a lateral opening in said passage;
   control means cooperating with said components of said series of bearing units for successively, partially opening each bearing. unit at the moment when said carrier approaches said bearing unit but after said bar stock and a major portion of said rod have passed through said bearing unit, to form a lateral opening of a size just sufficient to allow the carrier to pass successively through each bearing unit, said control means further controlling said components in all said bearing units to move away from one another by a further amount sufficient to open a lateral access route for lateral introduction of a subsequent piece of bar stock into said bearing units after advancement of said carrier through all said bearing units, said control means further controlling said components in all said bearing units to close said components into end-to-end mutual contact so that their respective concave walls form said fixed part of a hydrostatic bearing for said subsequent bar stock.

13. The feed apparatus of claim 12 wherein said passage is intended to guide bar stock of polygonal cross-section, wherein said rotary intermediate member opens with said components and includes a central aperture having a guide passage for matching polygonal bar stock, said feed apparatus further comprising:
   means for positioning said rotary intermediate member at the moment when said bearing unit is to open so that sector-type portions composing said rotary intermediate member and respectively corresponding to said components are stopped in angular positions such that each opens with a component; and
   retaining means for acting upon at least one sector-type portion of said rotary intermediate member so that at the time of opening, said rotary member portion is carried along and retained by said component, said retaining means preventing contact between rotary parts and non-rotary parts in the closed state of said bearing unit in which high speed rotation occurs, the oil pressure in said hydrostatic bearing holding said sector-type portions together despite rotation thereof.

14. The feed apparatus of claim 13, wherein said rotary intermediate member is formed of a middle portion divided into several parts forming said sector-type portions and cheek portions situated on at least one of the flanks of said middle portion and divided into cheek sections, at least one of the cheek and middle portions having a polygonal inside contour matching the cross-section of said bar stock, said retaining means including elements projecting radially and axially overhanging a circular lateral projection located under said overhang of said elements, said elements being mounted on one of the rotary and non-rotary parts of said hydrostatic bearing, while said projection is included in the other of said rotary and non-rotary parts.

15. The feed apparatus of claim 13, wherein connection means are provided in said sector-type portions for maintaining a firm connection between said sector-type portions so as to reinforce and to ensure, even for large-size parts rotating at high speed, that said sector-type portions are maintained together, the oil pressure in said hydrostatic bearing further ensuring that said sector-type portions are maintained together.

16. The feed apparatus of claim 15 having two components and two sector-type portions for each bearing unit, said connection means between the two sector-type portions of said rotary intermediate member including studs of one of the sector-type portions which enters a matching bore in the other sector-type portion, and laterally-acting spring means strongly engaging grooves in said studs inside the portion having said bore.

17. The feed apparatus of claim 16, wherein, in each of the two said sector-type portions of said rotary intermediate member, said studs are fixed to a small plate fixed in turn to the sector-type portion bearing said stud in order to ensure firm anchoring of said stud in the rotary said sector-type portion.

18. The feed apparatus of claim 13 having two components per bearing unit and two sector-type portions per rotary intermediate member, wherein said means for positioning said rotary intermediate member at the moment when said bearing unit opens after stopping of said rotary intermediate member and following passage of the entire bar stock, includes a bush slidably disposed on said pusher in front of said carrier, said bush being axially displaceable along a length of said pusher while being resiliently urged toward the front of said length, a pin or stud integral with one of the pusher and bush, said pin entering a slot or slide suitably formed on the other of said pusher and bush for determining the angular position of said bush on said pusher depending on the axial position of said bush on said pusher, said bush comprising a circular body having at least one active lug adapted to enter a notch in said rotary intermediate member upon modification of the angular position of said bush on said pusher when said active lug of said bush butts against said rotary intermediate member while said pusher continues to advance, regardless of the initial angular position of said rotary intermediate member, said active by then causing said rotary intermediate member to rotate to being the two sector-type portions of said rotary intermediate member into the desired angular postion.

19. The feed apparatus of claim 18, wherein said notch is a recess in at least one of the cheek portions on the side of said bearing unit facing the rear of said feed apparatus, said lug being arranged so that after engagement of said lug in said notch, said bush continues to rotate in the same direction until reaching the end of axial travel relative to said pusher, and said bush, with its lug crosses said rotary intermediate member axially, said arrangement of said lug permitting said bush to cross said rotary intermediate member at a moment of opening of said components and said sector-type portions of said rotary intermediate member, said circular body of said bush having a diameter allowing it to pass within said polygonal contour.

20. The feed apparatus of claim 18, wherein said notch is in the shape of a mortise passing through the whole axial dimension of said rotary intermediate member, said bush being resiliently urged toward the front by spring means having a sufficient resiliency such that, after engagement of said lug in the rear of said notch, said spring means urges said bush toward the front for causing it to return to its initial position on said pusher, said lug then sliding in an axial direction in said mortise-shaped notch while it rotatably drives said rotary intermediate member for bringing its two sector-type portions into the desired angular position.

21. The feed apparatus of claim 20, wherein said pusher further comprises, at least one holding lug fixed on said bush behind said active lug in alignment therewith, said at least one holding lug engaging, after said active lug, said mortise-shaped notch for ensuring the correct angular positioning of said rotary intermediate member after said active lug has disengaged from said mortise-shaped notch and until the lateral opening of said bearing unit and said rotary intermediate member for the passage of said carrier.

22. The feed apparatus of claim 14, wherein said middle portions and said cheek portions of said sector-type portions of said rotary intermediate member consist of several firmly joined, distinct.

23. The feed apparatus of claim 14, wherein said middle portions and said cheek portions of said sector-type portions of said rotary intermediate member are made as a unitary piece.

24. The feed apparatus of claim 23, wherein each unitary piece is made of a material selected from the group consisting of a molded, cast, and thermoformed mechanically resistant substance.

25. The feed apparatus of claim 1, wherein said feed apparatus includes hydraulically controlled elements, the oil for injection into said bearing units and hydraulically controlled elements being supplied from a common reservoir.

26. The feed apparatus of claim 18, wherein said at least one active lug is radially resiliently mounted on said circular body of said bush.

27. The feed apparatus of claim 20, wherein said pusher further comprises at least one holding lug on a sleeve fixed relative to said pusher and in alignment with said carrier, said at least one holding lug engaging said mortise-shaped notch after said active lug for ensuring the correct angular position of said rotary intermediate member after said active lug has disengaged from said mortise-shaped notch and until the lateral opening of said bearing unit and said rotary intermediate member for the passage of said carrier.

28. A method for axially feeding successive pieces of bar stock into a machine tool which rotatably drives the bar stock while the bar stock is advanced toward the machine tool by a pusher having a rod with a front rotating head and a rear carrier, said method comprising the steps of:
   guiding said bar stock followed by said rod of said pusher through a series of spaced, fixed hydrostatic bearing units each having a non-rotary part receiving an injection of oil and a rotary part, said bearing units having passages which are axially aligned for accommodating the passage of said bar stock and said rod of said pusher therethrough;
   successively, laterally, partially opening each bearing unit of said series of bearing units, at the moment said carrier approaches each of said bearing units but after said bar stock and a major portion of said rod have passed through said bearing unit, to a degree just sufficient to allow said carrier to pass therethrough;
   advancing said bar stock and carrier through the last of said series of bearing units;
   simultaneously, laterally opening all bearing units by a further amount sufficient for introduction of a subsequent piece of bar stock;
   simultaneously closing all bearing units after introduction of said subsequent piece of bar stock; and
   advancing said subsequent piece of bar stock through said series of bearing units and toward said machine tool with said pusher.

29. The method of claim 28, further comprising the steps of:
   returning said pusher to a position upstream of a first bearing unit of said series of bearing units after said pusher has been advanced through said last bearing unit;
   laterally retracting said pusher prior to simultaneously opening said bearing units to allow lateral introduction of a subsequent piece of bar stock; and
   returning said pusher to a position behind a rearward end of said bar stock after closing of said bearing units and before advancing said bar stock.

30. The method of claim 29, wherein said bar stock is advanced independently of said pusher when said pusher is retracted.

31. The method of claim 28, wherein said bar stock rotates while advancing through said hydrostatic bearing units, the rotary part of said hydrostatic bearing units being said bar stock.

32. The method of claim 28, wherein said bar stock passes through a rotary intermediate member that includes at least two sector-type portions axially held in the non-rotating part of said hydrostatic bearing unit, the rotary part of said hydrostatic bearing unit being said rotary intermediate member.

33. The method of claim 32, further comprising the steps of positioning said sector-type portions of said rotary intermediate member in a particular angular position before said hydrostatic bearing units open to enable said hydrostatic bearing unit to open, and retaining said sector-type portions in said hydrostatic bearing unit once a hydrostatic bearing unit is open.

* * * * *

UNITED STATES PATENT AND TRADEMARK OFFICE
CERTIFICATE OF CORRECTION

PATENT NO. : 4,628,779
DATED : December 16, 1986
INVENTOR(S) : Alexandre Ed LOUIS It is certified that error appears in the above-identified patent and that said Letters Patent is hereby corrected as shown below:

Column 21, claim 22, line 4, after "distinct" insert --parts--.

Signed and Sealed this

Seventeenth Day of October, 1989

*Attest:*

DONALD J. QUIGG

*Attesting Officer*    *Commissioner of Patents and Trademarks*